(12) United States Patent
Sved

(10) Patent No.: US 7,897,934 B2
(45) Date of Patent: Mar. 1, 2011

(54) PROCESS FOR NEUTRON INTERROGATION OF OBJECTS IN RELATIVE MOTION OR OF LARGE EXTENT

(76) Inventor: John Sved, Delmenhorst (DE)

( * ) Notice: Subject to any disclaimer, the term of this patent is extended or adjusted under 35 U.S.C. 154(b) by 0 days.

(21) Appl. No.: 12/592,329

(22) Filed: Nov. 23, 2009

(65) Prior Publication Data

US 2010/0148084 A1    Jun. 17, 2010

Related U.S. Application Data

(62) Division of application No. 11/659,890, filed as application No. PCT/EP2005/008725 on Aug. 11, 2005, now Pat. No. 7,663,119.

(30) Foreign Application Priority Data

Aug. 12, 2004    (EP) .................................... 04019144

(51) Int. Cl.
    *G01N 23/00* (2006.01)
(52) U.S. Cl. .................................................. 250/390.04
(58) Field of Classification Search .............. 250/359.1, 250/390.1, 390.04
    See application file for complete search history.

(56) References Cited

U.S. PATENT DOCUMENTS

| | | | |
|---|---|---|---|
| 3,530,036 A | 9/1970 | Hirsch | |
| 3,736,429 A | 5/1973 | Foley | |
| 3,787,321 A * | 1/1974 | Dahlen et al. ................. | 252/644 |
| 3,832,545 A | 8/1974 | Bartko | |
| 4,565,926 A | 1/1986 | Crane | |
| 4,587,555 A | 5/1986 | Carollo et al. | |
| 4,851,687 A | 7/1989 | Ettinger et al. | |
| 4,882,121 A | 11/1989 | Grenier | |
| 4,918,315 A | 4/1990 | Gomberg et al. | |
| 5,057,268 A | 10/1991 | Muller | |
| 5,080,856 A | 1/1992 | Grenier et al. | |
| 5,098,640 A | 3/1992 | Gozani et al. | |
| 5,124,554 A | 6/1992 | Fowler et al. | |

(Continued)

FOREIGN PATENT DOCUMENTS

AU    737462    6/1999

(Continued)

OTHER PUBLICATIONS

International Search Report.

(Continued)

*Primary Examiner* — David P Porta
*Assistant Examiner* — Marcus H Taningco
(74) *Attorney, Agent, or Firm* — Collard & Roe, P.C.

(57) ABSTRACT

The invention relates to the fact that a common industrial neutron interrogation screening requirement is that a high throughput rate be accommodated by the screening system. The accumulation of elemental abundance ratio spectral data to minimize statistical uncertainty is a function of the neutron flux passing through the subject. If the subject passes through a neutron beam, with a strictly limited time window for exposure, the flux must be sufficient to accumulate the required statistics. The level of neutron flux necessary may exceed the cost effective limits of the selected neutron source means. Exposure time window dilation is disclosed through a class of system configurations which become practical for reduction to practice by utilization of linear neutron source topology neutron generators. This disclosure is concerned with example embodiments which utilize the length, width, thickness and segmentation of the source emission zone within an appropriate neutron source.

8 Claims, 10 Drawing Sheets

U.S. PATENT DOCUMENTS

| | | | |
|---|---|---|---|
| 5,135,704 | A | 8/1992 | Shefer et al. |
| 5,153,439 | A | 10/1992 | Gozani et al. |
| 5,200,626 | A | 4/1993 | Schultz et al. |
| 5,278,418 | A * | 1/1994 | Broadhurst .............. 250/390.04 |
| 6,215,122 | B1 | 4/2001 | Clifford et al. |
| 6,393,085 | B1 | 5/2002 | Heller et al. |
| 6,433,495 | B1 | 8/2002 | Wilberg |
| 6,922,455 | B2 | 7/2005 | Jurczyk et al. |
| 2002/0131542 | A1 | 9/2002 | Leung |
| 2002/0131543 | A1 | 9/2002 | Leung |
| 2002/0150193 | A1 | 10/2002 | Leung et al. |
| 2002/0175288 | A1 | 11/2002 | Taleyarkhan |
| 2003/0080192 | A1 | 5/2003 | Tsikos et al. |
| 2003/0152186 | A1 * | 8/2003 | Jurczyk et al. ................ 376/109 |
| 2003/0223528 | A1 | 12/2003 | Miley et al. |

FOREIGN PATENT DOCUMENTS

| | | |
|---|---|---|
| DE | 197 45 669 | 5/1999 |
| EP | 0 227 497 | 7/1987 |
| EP | 0 297 249 | 1/1989 |
| EP | 0 459 648 | 12/1991 |
| FR | 2 641 867 | 7/1990 |
| GB | 1047596 | 11/1966 |
| GB | 2 242 520 | 10/1991 |
| GB | 2 305 290 | 4/1997 |
| RU | 2 046 324 | 10/1995 |
| SE | 513 191 | 7/2000 |
| WO | WO 96/13839 | 5/1996 |
| WO | WO 98/55851 | 12/1998 |
| WO | WO 01/07888 | 2/2001 |
| WO | WO 02/101758 | 12/2002 |
| WO | WO 03/019996 | 3/2003 |

OTHER PUBLICATIONS

Alfassi and Chung, "Prompt Gamma Neutron Activation Analysis," CRC Press, 1995, pp. 34-35, 42-43, 106-107, 136-137, 150-151, 164-165, and 174-175.

Andy Buffler, "Contraband detection by fast neutron scattering," 2004 paper published by Elsevier Ltd., (Presented at 2nd National Nuclear Technology Conference, NAC, South Africa, May 13-15, 2001).

* cited by examiner

PROCESS FOR NEUTRON INTERROGATION OF OBJECTS IN RELATIVE MOTION OR OF LARGE EXTENT

CROSS REFERENCE TO RELATED APPLICATIONS

This application is a divisional of and Applicant claims priority under 35 U.S.C. §§120 and 121 of parent U.S. patent application Ser. No. 11/659,890 filed Apr. 19, 2007 now U.S. Pat. No. 7,663,119. Applicant claims priority under 35 U.S.C. §119 of European Application No. 04019144.7 filed Aug. 12, 2004. Applicant also claims priority under 35 U.S.C. §365 of PCT/EP2005/008725 filed Aug. 11, 2005. The international application under PCT article 21(2) was not published in English.

FIELD OF THE INVENTION

This disclosure teaches about a class of configurations of neutron source, moderator, collimator, shielding, the subject or a plurality of subjects to be scanned and the traverse kinematics which exploit the linear source geometry in order to add a time dilation design variable to the optimal design of neutron interrogation systems or general neutron irradiation systems.

The availability of neutron sources which are elongated in one or two dimensions so as to be defined as functional line or plane sources enables many commonly proposed application system geometries. Several line source like neutron generators have been proposed including the reference prior art invention of which this disclosure is a class of embodiments. Neutron interrogation techniques are applied in appropriate laboratories and in some industries in a on-line or in-line situation as a contact-less measurement technique. A common industrial requirement is that a short scanning time per unit subject is required. The accumulation of elemental abundance ratio spectral data to minimize statistical uncertainty is a function of the neutron flux passing through the subject. If the subject passes through a neutron beam, with a strictly limited time window for exposure, the flux must be sufficient to accumulate the required statistics. The level of neutron flux necessary may exceed the cost effective limits of the selected neutron source intensity. Exposure time window dilation is disclosed through a class of system configurations which become practical for reduction to practice by utilization of linear neutron source geometry neutron generators.

DESCRIPTION OF THE PRIOR ART

References Cited

Prompt Gamma Neutron Activation Analysis, Ed. Alfassi and Chung, CRC Press, 1995
Contraband detection with fast neutrons, Andy Buffler, Dept. of Physics, University of Cape Town, 2004 paper published by Elesevier Ltd. Www.elsevier.com/locate/radphychem
Leung et al US pat. Application No. 2002131543 Mar. 16, 2001
Leung et al U.S. Pat. application No. 2002130542 Mar. 16, 2001
Sved PCT Application WO03019996 GB20010020280 Aug. 21, 2001
Jurczyk et al. U.S. Pat. No. 6,922,445 Jan. 28, 2002
Leung et al U.S. Pat. application No. 2002150194 Mar. 18, 2002

BACKGROUND OF THE INVENTION

The utilization of neutrons for contact-less or non destructive measurement has been well documented. Many techniques have been proposed and reduced to practice. The ongoing development of sensor technology such as semi conductor material based electronic circuit elements with a reproducible transducer function in response to ionizing radiation will certainly yield further inventions and improvements of sensor devices and sensor systems. Such technologies reveal the energy spectrum of impinging corpuscular or photonic "particles". Analysis of the energy spectra can reveal the elemental and isotopic bulk composition of the object irradiated by the neutrons. The analysis has to subtract background spectra, accounting spatial factors, and then compare the remaining spectrum against known reference spectra as is practiced by the general discipline of spectroscopy.

Neutron based analysis techniques include but are not limited to:
 Prompt Gamma Neutron Activation Analysis PGNAA
 Pulsed Gamma Neutron Activation Analysis PGNAA
 Neutron Elastic Back Scatter NEBS
 Pulsed Fast Neutron Activation Analysis
 Instrumental Neutron Activation Analysis
 Thermal Neutron Activation Analysis The source of the neutrons may be a nuclear fission reactor which is a very expensive option; radionuclide decay where neutrons are emitted by an isotope such as Californium 252; charged particle accelerator machines that target protons or deuterons onto a target which holds certain low atomic number elements in order to yield neutrons from fusion or spallation reactions; compact sealed versions of the accelerator method; sealed devices where a deuterated or tritiated solid target is hit by deuterium or tritium ions extracted from a plasma and accelerated toward the target surface; laser powered devices that cause sufficient transient pressure and heat in tiny droplets to induce fusion reactions; and electrostatic devices referred to as inertial electrostatic confinement (EC) or inertial electrostatic fusion (IEF) or "fusor" where a solid target is not required as the fusible species are confined to a zone of increased collision probability.

Nuclear fusion grade collisions of low atomic number nuclei have been utilized to produce particles such as neutrons, protons and various fragments of the nuclei that constitute the fused product.

Typical examples of such fusion reactions for neutron generation include:
 a) $_1D^2 + _1D^2 \to _2He^3$ (0.82 MeV)$+_0n^1$ (2.45 MeV)
 b) $_1D^2 + _1D^2 \to _1T^3$ (1.01 MeV)$+_1p^1$ (3.02 MeV)
 c) $_1D^2 + _1T^3 \to _2He^4$ (3.5 MeV)$+_0n^1$ (14.1 MeV)
 d) $T^3+T^3$ reaction yielding neutrons of various energies for a "white" spectrum.
 d) protons on Be
Proton generating reactions may utilized.

The rate of neutron generation for commercially available neutron generators may be expected to have an upper limit of approximately $10^{10}$ n/s for the DD reactions a) and b). In the case of the DT reaction c) the increased collision cross-section is known to yield a factor of between 80 and 100 more neutrons per unit time for the same operating conditions or reactor type. As the reaction rate is increased there is a reduction of operational life between servicing sessions. The devices that are classed as sealed tube neutron generators have lifetimes of a few hundred hours. Neutron generators with distributed solid targets and target sputter erosion effects mitigation means have been developed to have lifetimes of 3000-4000 hours with DD neutron outputs of $10^8$ and $10^6$ neutrons per second from point like origins respectively for devices developed and manufactured by Thermo and Sodern respectively. The plasma-gas target neutron generator as disclosed in patent application Sved WO03019996 incorporated herein by reference which has been developed and manufactured by NSD-Fusion by has specific performance in the $10^7$ DD n/s range for a 50 mm long electrode which may be increased by length and input power increase. It has an operational lifetime between servicing that is measured in years. The desire for higher neutron output must be tempered by the implications for neutron shielding and the consequential size and cost impact on any practical neutron applications system housing.

There is a relationship between the flux of impinging neutrons and the time required to accumulate spectral statistics with sufficient information content. Flux is usually stated in terms of neutrons per square centimeter per second. A unit volume of matter will be mostly transparent to the neutrons with exceptions determined by the probability of capture of a slow neutron by a nucleus or collision with deflection of the fast neutron trajectory and an energy exchange. These interactions may be modelled mathematically and hence simulated in computer programs to yield predictions about the overall behavior of a flux field of neutrons with defined initial conditions. By such means one experienced in the skills of nuclear physics may design or optimize design parameters so that the sensors will receive the maximum flux of scattered neutrons if that is the intention or emitted gamma energy domain photons with mitigated flux of unwanted radiation.

Such analysis and reductions to practice may be compromised or constrained by available materials and equipment. Neutron energies from sources are usually determined by the physics of nuclear reactions so that initial energies are essentially fixed at certain values as indicated in the table. Some nuclear reactions can cause a spread energy spectrum which can be utilized. Certain techniques will moderate or slow the neutrons by collisions. These resultant slow neutrons will then be more easily captured by nuclei which then decay, sometimes in compound chains of decay steps, to yield distinctive energy photons.

The design process of a neutron interrogation system considers such factors and uses published characteristics for the various nuclear interactions. Also to be incorporated into the design process are the unwanted but present secondary emissions from shielding and instrumental limitations and sources of electronic noise. Another design factor is the counting limitation of detector systems where the frequency of gamma or neutron events that can be correctly resolved and processed into electronic event energy information will impose a practical upper limit on the impinging flux of neutrons.

This disclosure is concerned with design parameters that can be influenced by the neutron source emission zone topology. In particular the length, width, thickness and segmentation of the source emission zone within a sealed unit. Such design parameters plus the specific performance of the neutron emission zone can give the neutron interrogation system designer more flexibility to achieve a system performance specification such as effective measurement of objects being put through the system at a specified rate.

The necessity for this invention arises from industrial applications of neutron interrogation including but not limited to:

A) security screening of luggage where only 8 seconds per item is specified for Level 1 or 2 screening.

B) food safety screening on the production line where the food units may be packaged, pre-packaged, raw food stuff delivered to the processing line, frozen food units such as individual vegetables, animal carcasses, cuts of meat, pulp vegetable matter, fruit juice or any other variant of bulk food or a stream of food units.

C) Postal letters at a mail sorting facility

D) Couriered packages at a sorting facility

E) Bulk material in a production line flow on a conveyor belt, channel or in a pipe A common characteristic in the above mentioned examples is that the flow rate of items to be scanned is relatively high and indeed too high for the neutron interrogation systems that have been deployed into practical operation. It must be clarified that the on-line analyzer neutron interrogation systems that can be found in cement, coal and some other mineral mining and processing operations monitor a fast moving conveyor belt that carries bulk material that has a high uniformity where compositional changes may vary only relatively slowly from the point of view of the process operator.

Line sources characteristics have been recognized and exploited with radionuclides since at least the 1960s with descriptions such as line or bar or rod or annular source. http://www.orau.org/ptp/collection/Sources/sources.htm Neutrons have been applied to the interrogation of materials to help determine the structure and elemental or isotopic composition of the materials. The observable interaction products are well documented as gamma photon energy spectral signature data under categories of application such as Neutron Activation Analysis, Thermal Neutron Analysis and Prompt Gamma Neutron Activation Analysis, Inelastic Neutron Scattering to name only a few of the common terms. In these applications it is necessary to have a flux of neutrons that can pass into the material that is to be interrogated. The source of the neutrons may be a nuclear fission reactor which is a very expensive option; radionuclide decay where neutrons are emitted by an isotope such as Californium 252; charged particle accelerator machines that target protons or deuterons onto a target which holds certain low atomic number elements in order to yield neutrons from fusion or spallation reactions; compact sealed versions of the accelerator method; and various plasma producing devices where ions are extracted and accelerated by electrostatic fields to impinge on solid targets or self collide within the plasma.

Neutrons are attractive for many industrial analysis, medical and security inspection applications because they are very penetrating and can have residual non-biological side effects that are so small that they cannot be measured by any known technology. Unlike X-rays and gamma rays they will interact with other atoms/isotopes of materials which will in turn produce a gamma photon energy signature. For example, neutrons will interact with nitrogen which is the major constituent of all chemical explosives. The neutron interacts with the nitrogen nucleus, which in turn gives off a characteristic energy gamma photon. A standard commercially available gamma spectrum detection system can find concealed explosives in baggage and it is very difficult to shield out the neutrons without raising suspicion. Enhancement of the gamma detection and recognition electronics and software can enable a commercially attractive explosives detection system to be feasible if a compatible neutron source can be integrated into a sufficiently compact, robust, long lived and safe system.

From the industrial customer point of view, whilst neutrons are attractive they are hard to produce on demand conveniently or cheaply. The radionuclide source of neutrons has been the lowest cost source of neutrons but the inability to switch off the source has imposed difficult operational safety requirements. Solving these design requirements for practical neutron applications systems has added to the cost of manufacture and the cost of operation. In the case of the frequently used Californium 252 neutron source, there is a half life of 2.65 years. This requires the operator of an industrial measurement system to top-up the 252Cf neutron source every two and a half years if a reduction of fifty percent of the neutron flux can be tolerated. There is a recurring cost associated with procurement, safety monitoring and ultimate authorized disposal of the radioisotope neutron source capsules.

An alternative technology that has been offered commercially for about 30 years is the so-called sealed tube neutron generator. This technology is based on the trigger device on H-bomb nuclear weapons where an intense flux of neutrons is generated to initiate the chain reaction. Typically, a sealed tube neutron generator uses an electric field to accelerate deuterium ions from an appropriate source into a tritium target so as to bring about a fusion reaction with accompanying neutron generation. A typical sealed tube neutron generator uses a deuterium-tritium fusion reaction to yield 14.1 MeV energy neutrons. The shelf life of such a device must be very long and is constrained by the 12 year half life of tritium. The operational life of the device is very short prior to its total destruction within the nuclear weapon. These sealed tube devices have been commercialized but have found almost no acceptance in industrial settings where the requirement for economic life cycle costs have been too severe for that technology. Either 252Cf neutron sources have been most often used or there has been no implementation of a neutron interrogation system. The industrial user would rather select another non-neutron technology after trading the advantages and disadvantages.

The sealed tube neutron generators have an operational life or endurance that is typically only a few hundred hours. Recent products on the market claim 2000 hours or even 4000 hours before tube replacement. The cost of exchanging of a sealed tube device, which includes authorized recovery of the tritium gas, is prohibitively high. 252Cf neutron sources can still compete against conventional sealed tube neutron generators. If the conventional sealed tube neutron generators could demonstrate an operational lifetime of 10,000 hours or better still 25,000 hours, there would be less of a cost difference compared to 252Cf neutron sources. However the routine tube replacement cost would have to be comparable to or less than the 252Cf top-up cost.

A further problem with the sealed tube neutron generator is that the obtainable lifetime is achieved by a combination of compromises. The fusion reaction rate is reduced from the maximum that the device can theoretically deliver by a reduction of the applied ion beam current. This has the desired effect of reducing the sputter erosion rate of the solid target. This may be described as de-rating the device output performance in order to lengthen the device operational life. A consequence is that the neutron production rate is also reduced. A typical specified neutron production rate for applications in on-line minerals analysis is $1 \times 10^8$ neutrons per second total output. Californium 252 sources of $2 \times 10^8$ n/s are utilized. After 2.65 years the 252Cf source strength will have reduced to $1 \times 10^8$ n/s. Therefore a sealed tube neutron generator has to deliver at least $1 \times 10^8$ n/s to be comparable. The costs of manufacturing have forced sealed tube neutron generator manufacturers to modify existing weapons-derived devices. Consequently, a deuterium-tritium isotope fusion reaction has to be utilized to achieve the $1 \times 10^8$ n/s reaction rate. If a deuterium-deuterium fusion reaction were to be used, the same sealed tube device, filled only with deuterium, would emit about $1 \times 10^6$ n/s.

A further problem with the sealed tube neutron generators that utilize the D-T fusion reaction is that the D-T fusion neutron energy is 14.1 MeV. The Californium 252 decay neutrons range in energy from about 1 MeV to 10 MeV. The mean energy is about 2.1 MeV. There are also various gamma photons emitted as part of the decay products. While D-T 14 MeV neutrons are useful because they are more penetrating than 2.1 MeV neutrons, and while the higher energy enables certain interactions with certain elements such as oxygen, there are also problems. In particular, there are neutron interactions that rely on low energy or so-called thermal energy neutrons where the neutron has been slowed down to kinetic energies amounting to tens of KeV or less. In order to slow the high energy neutrons, moderator materials are used to cause energy reduction through collisions. The released energy is manifested as other energy forms such as gamma photons. In some applications these photons act as unwanted detected noise that masks the desired gamma photons from thermal neutron interactions. Therefore it is often necessary to use source neutrons of as low an energy as practical. So 252Cf neutrons of mean energy 2.1 MeV would be preferred over 14.1 MeV D-T neutrons. Clearly in this example a mono energy 2.45 MeV D-D neutron generator would be more preferred if other requirements would be compatible.

In some applications, such as Boron Neutron Capture Therapy (BNCT) for the treatment of inoperable cancer tumors, the neutron flux must be precisely defined in order to be generally accepted as part of an approved medical therapy. The quality of the neutron flux from accelerator sources or sealed tube neutron generators is deemed by some commercially organized BNCT researchers not to be ideal. Accelerator spallation neutron sources will generate a range of neutron energies. The moderation and collimation of a range of neutron energies is obviously more difficult than for mono energy neutrons. Sealed tube devices do provide mono energy neutrons but suffer from unreliability of the neutron output as do the accelerator spallation neutron sources. The solid targets that these devices use suffer from altered characteristics due to the damage they incur through use. The electrostatic confinement of fusible ions in a neutral gas and ion mix plasma does not suffer from target degradation. The reactants are continuously renewed in the fusion zone. Reactant gas contamination can be mitigated so that the neutron output quality can be constant for a given set of controllable operating parameters.

An advantage that any electrical neutron generator should offer is the ability to switch on and off repeatedly to create a pulsed mode of operation. The pulse mode duty cycle may range from minutes or seconds of ON time and similar intervals of OFF time to micro- and even nanoseconds pulse duration It is not necessary, cost effective or perhaps not practical to offer the entire pulsing duty cycle range in every neutron generator. Pulsed current where the current is many orders of magnitude greater than for a DC or chopped DC pulse mode mandates pulsed operation. The main advantage of the pulsing mode is to cut off the noise caused by the higher energy neutron interactions and then detect the thermal neutron or other delayed interactions where prompt gamma photons are not emitted instantaneously. The implementation of mechanical shutters to make 252Cf into a pseudo-pulsed neutron source is not practical nor cost effective.

A further cost consideration is the often requested configuration of the neutron source as a non-point of origin. The neutron flux intensity decreases as the inverse square of the distance from the point of origin in the case of a point-like source. In many industrial applications the object that is to be interrogated by the neutrons has a large characteristic size.

For example, a mineral stream on a conveyor belt may be so wide that the extremities will receive a significantly reduced flux of neutrons compared to the middle portion. This has undesirable consequences for the efficiency of the detection of gamma photons arising from the neutron interactions. Optimization of the gamma detector configuration may not be sufficient or cost effective. A second point source neutron emitter is often introduced to mitigate the edge losses.

With the usage of two point sources, there is a doubling of the cost of the neutron source. This is tolerated for some commercial neutron analysis systems where 252Cf has been the only practical source. However, it is more problematic for a neutron application system that would use two neutron generator devices. Since each individual neutron generator system consists of the reactor device, a high voltage power subsystem, an electronic controller sub-system and ancillary cooling sub-system, multiple copies of the equipment would be required. The operation of two or more sealed tube devices connected in parallel to one set of appropriately specified ancillary sub-systems seems to be only a marginal cost reduction compared to two separate sealed tube neutron generator sets.

A more ideal line source that is made from discrete 252Cf radioisotope neutron sources can be contemplated. Such a linear geometry 252Cf neutron source has been proposed for land mine detection. In such a configuration 252Cf pellets would be spaced in a line at intervals optimized so that the gamma detectors would not suffer from the non-uniformity of the neutron flux field. The length of the land mine detection linear neutron source that would necessarily be suspended in front of a suitable vehicle may be as much as 4 meters. This implies that many 252Cf pellets would be used. A design constraint that can be expected is that the total activity level should remain low enough to gain a permit for operation. This may reduce the effectiveness of the land mine detector system. Higher radioactivity levels may not be permitted without severe design requirements for the withdrawal and shielding of the numerous capsules of 252Cf. Damage to the system by an exploding land mine is a further difficulty. Neutron generators seem more appropriate since they can be instantly switched off. However, the use of several conventional sealed tube neutron generators would be a significant fraction of the total system cost. Further complexity would arise from the control problem associated with matching of output of multiple sealed tube units. A sealed vessel containing a linear solid target and a particle beam deflection system can be envisaged. The particle beam would be deflected much like electrons in a cathode ray tube or television picture tube to scan back and forth along the target. The neutron emission would exit the device as a moving spot or point source. Such a system is considered to be a very expensive option due to the inherent complexity and reliability concerns. A long linear configuration neutron generator reactor chamber in accordance with embodiments of the present invention is expected to overcome such difficulties.

The sealed tube neutron generator technology is inherently age-limited by the unavoidable erosion of the solid target. This component is a metal such as titanium that has been impregnated with tritium or deuterium gas. The incident high energy deuterons have the effect of causing sputter erosion of the target. The sputter product condenses as a metallic film on the inside surfaces of the sealed tube device. The use of voltages near 100 kilovolts results in a short circuit condition as the metallic film builds up. Even before this ultimate failure mode, the highly localized beam causes a hot spot and associated gas depletion within the target. Various neutron yield degradation mitigation schemes have been employed but the fact remains that the best guaranteed lifetime of a sealed tube neutron generator is only 4000 hours.

The invention Sved WO03019996 incorporated herein by reference has been conceived as a new technology that addresses the cost problems associated with 252Cf and the short life neutron generators as described above. The elimination of solid target erosion is an attractive possibility of the Inertial Electrostatic Confinement IEC concept. The constant renewal of the colliding nuclei within the fusion target zone is a further attraction for producing a constant neutron yield. The demonstration and experimentation in three different laboratories of a different linear geometry electrostatic nuclear fusion reactor of the type described by Gu et al. US2003223528 which is not the present invention has been an additional incentive to create a practical system for commercial industrial application.

SUMMARY OF THE INVENTION

Technical details and explanations given in PCT Application WO03019996 (GB20010020280) are incorporated in the present application by reference.

Embodiments of the present invention seek to provide apparatus that may optionally use other neutron sources with a line or planar source topology such as an array of point sources or neutron generator devices. All details concerning such neutron generator devices as disclosed in US2002131543 or U.S. Pat. No. 6,922,455 as herewith incorporated by reference.

Embodiments of the present invention seek to provide apparatus that utilizes continuous direct current or pulsed power input whereby the electrical current is in the order of tens of amperes during the pulse thereby exploiting an observed fusion neutron generation rate enhancement characteristic of super linear proportionality with the applied current for Inertial Electrostatic Confinement type reactors.

Embodiments of the present invention seek to provide apparatus for utilization of neutron sources for a duration of thousands of hours to several years with little or no maintenance to the neutron source nor to the associated neutron interrogation sensors and data processing equipment.

Embodiments of the present invention seek to provide neutron interrogation apparatus of high reproducibility in mass produced embodiments.

Embodiments of the present invention seek to provide neutron interrogation apparatus that are structurally robust for operation in industrial locations in static systems.

Embodiments of the present invention seek to provide apparatus for utilizing neutrons emitted isotropically from a zone whose extent can be specified as an array of point sources or an array of neutron emission zones from linear or planar topology neutron sources.

Embodiments of the present invention seek to provide apparatus for utilizing neutrons emitted from an elongated zone or multiple zone segments in the case of a cluster of linear topology neutron sources which are functionally interlinked.

Embodiments of the present invention seek to teach the utilization of the elongated or linear neutron emission field whereby an object to be interrogated is arranged to traverse the linear neutron field along the long axis rather than the prior art described traverse at an angle substantially 90 degrees to the long axis of the linear neutron source.

Embodiments of the present invention seek to teach the utilization of the elongated or linear neutron emission field whereby an object to be interrogated may be arranged to traverse through the substantially linear and cylindrical neutron field in a trajectory that holds a substantially constant radius from the center line of the cylindrical neutron emission zone with a combined longitudinal traverse vector which defines a spiral locus or path from one end of the cylindrical neutron field to the other end which maximizes exposure to the neutron flux while avoiding a physical overlap or collision with other objects following the same path.

Embodiments of the present invention seek to teach the utilization of the elongated neutron emission zone which may be segmented by the construction of a segmented electrode structure within the neutron generator device or clusters of point sources.

Embodiments of the present invention seek to teach that the segmentation of a linear topology neutron generator neutron emission zone determining electrode structure into a plurality of such structures and corresponding neutron emitting zones will mitigate electrical power consumption utilization where the passage of electric current from cathode to anode does not occur between the active electrode sections thereby enabling linear neutron generators to have a reaction chamber and total electrode length that may be longer than the effective or neutron emitting length.

According to a first aspect of the present invention, there is provided a neutron producing apparatus of substantially line source topology, within which vessel is disposed an elongate cathode and anode electrode structure which is segmented into active zones inter-spaced with passive or non-emitting zones, surrounded by neutron absorbing material within which there are apertures positioned adjacent to the neutron emission zones so as to direct a beam of neutrons, the apertures forming a row along which the object to be scanned is moved so as to be interrogated by one or more well known techniques utilizing neutron detectors or gamma quanta detectors interconnected so that their measurement data is multiplexed in a central data processing device to accumulate the elemental component ratio statistics which can be tested for anomalous patterns which would indicate that the relevant object that has been scanned should be diverted for additional inspection.

According to a second aspect of the present invention, there is provided a neutron producing apparatus of substantially line source topology, surrounded by neutron moderating material from which the average energy of the neutrons is in the so-called thermal range and optimal to impinge on the object to be scanned which is moved so as trace a spiral locus about the cylindrical neutron source and moderator structure in order to maximize the duration of transit through the neutron field while enabling a continuous high throughput of objects to be interrogated by one or more well known techniques utilizing neutron detectors or gamma quanta detectors interconnected so that their measurement data is multiplexed in a central data processing device to accumulate the elemental component ratio statistics which can be tested for anomalous patterns which would indicate that the relevant object that has been scanned should be diverted for additional inspection.

Preferably, the apparatus is adapted to generate 2.5 MeV or 14 MeV neutrons in a "macro" linear or curvilinear geometry, where the expression "macro" is used to distinguish between a relatively small "micro" sized neutron source geometry such as a single pellet of radioactive isotope or the target zone of a charged particle beam from a particle accelerator machine and a "mega" sized neutron source such as a fission reactor core or a star. In other words, "macro" implies a size or scale that is useful for industrial applications. This may range from approximately 1 cm line source length for envisaged medical neutron beam source applications to several meters for baggage or postal security screening or a production line product quality and food safety screening system. The macro characteristic also implies that the macro scale device may be built from an ordered collection of micro sized units. This is the case in certain embodiments of WO03019996 incorporated here by reference. Embodiments of the devices disclosed in US2002131543 and U.S. Pat. No. 6,922,455 may be substituted but the complexity will be greater.

A straight line configuration of the apparatus may be fabricated as segments that can be arranged into curvilinear shapes which may be generally conformal to target objects that are to be more uniformly irradiated by neutrons produced by the apparatus. The preferred embodiments utilize straight forms of the linear or planar neutron source topology.

For the first aspect of the present invention a row of neutron interrogation stations is established where by a continuous stream of objects to be scanned is passed from one and of the row to the other. The row of scanning stations may be straight or curvilinear or folded to achieve more compact configurations. A cost saving advantage is the utilization of one neutron generator device as defined by a reaction chamber, high voltage power supply, reactant gas pressure equipment and a central control unit A reaction chamber assembly with definable neutron emission zones is provided by means of WO03019996 incorporated here by reference. It is a feature of the present invention that the neutron source does not have to be one contiguous neutron emission zone. Spacing and isolation between neutron interrogation stations is a likely detailed design requirement in order to ensure that the gamma quanta detected by a sensor at a specific interrogation station are indeed emitted from the local neutron field Isolation may in part be achieved by neutron and gamma absorbing shielding materials but apertures will be required to allow passage of the non-stop stream of objects. The ability to arrange the structure of the cathode grid into electrically connected segments with non-functional segments of connecting rod conductor between the active segments is a versatile feature of the present invention. The neutron emission zones can be positions where neutrons are required; typically at the mid points of the scanning stations. Neutron flux is reduced at the location of isolation baffles. This reduces the required amount of neutron absorbing material.

A further benefit of neutron zone segmentation is that the overall length of the reaction chamber may be substantially greater than the effective total length of the neutron emission zone cathode structure. Since the generation of neutrons can demand power of 1 kW per 5 cm of cathode length, it is apparent that unnecessary neutron emission zone length can save very significant amounts of 100 kV class very high voltage power. Power supply cost is a very significant design fact.

A multi interrogation station security screening tunnel system can be configured so that the data from each station is multiplexed and accumulated for each object as it passes through the tunnel. All sensors may be identical. However, a tunnel of sufficient length and number of scanning stations may be equipped with sensors plus neutron moderation and collimation to optimize the neutron interrogation instrument for best detection of specific ranges of elements, or for penetration of the object being scanned. Neutron moderation may be changed along the line source by changes of the thickness and scattering characteristics of the moderator at each scanning station. Similarly the gamma quanta energy sensitivity and detector cost can be varied. A neutron detector may be used in one scanning station with no moderation in order to measure the attenuation of the neutron beam caused by Hydrogen rich materials such as plastics.

A substantial bend of the neutron generator chamber can be achieved by a segmented chamber wall. The cathode grid components may be constructed as short straight segments of a length compatible with short segments of the vessel wall and held together by spindle structures that are similar to end spindles of the cathode structure but fabricated with appropriate angles to enable electrical and structural interconnection of the cathode grid segments so that they may be placed on a local central axis of each straight segment. Thereby various bend angles and U bends may be implemented for a folded tunnel system.

A particular advantage of embodiments of the present invention using WO03019996 is that neutron emission can be made extremely consistent, which means that it is relatively easy to remove extraneous noise effects in practical applications of the invention by an appropriate noise subtraction process. Pulsed neutron operation is a well documented part of many neutron interrogation techniques. The pulse duration and repetition rate should be compatible with the transit time of the objects being interrogated and with the data processing characteristics of the detector equipment.

Embodiments of the present invention may be used in boron neutron capture therapy for treatment of cancer and the like in human or animal subjects. According to a third aspect of the present invention there is the utilization of the linear and planar topology of the neutron source in combination with certain types of thermal neutron collimation devices such as disclosed by Franks GB 1047596 which teaches a Soller type collimator made of glass for point sources or preferably the rolled bimetallic micro-Soller type as disclosed by B. E. Allman, A. Cimmino and A. G. Klein & W. A. Hamilton, Proc. SPIE 3449,175 (1998) (see website http://scatterbrain.ssd.ornl.gov/NSatHFIR/RecentResearch/WAH/MicroSol/MicroSol.HTML). The micro-Soller collimator is essentially composed of a bimetallic or bi-layer or multilayer composite foil where one metal such as Aluminum has negligible absorption and scattering for thermal neutrons and the other such as Gadolinium is highly absorbing of the neutrons. The transmission foil may be ten of microns thick while the absorbing layer is as thin as practicable (3 microns) to minimize cross-sectional blockage. The composite foil is ductile and rolled to either a circular form or an elongated form. If the layers are tapered the rolled foil will assume a conical topology with the effect of focusing the emerging thermal neutrons. The foil may also be cut and layered. It is feasible to optimize the tapper, as well as the entry and exit faces to optimize the collimator for the complex linear or planar neutron emission fields and moderator material in order to produce a thermal neutron beam of either near parallel moving thermal neutrons or converging thermal neutrons. Development of this technology would first establish the supply of bimetallic composites meeting dimensional and other quality specifications. Test collimators would be build and tests to verify computational design models. With the verified models of the linear and planar neutron source, an optimal thermal neutron beam, producing assembly can be produced The transmission loss of such a device has been reported to be approximately 50% in a proof-in-principle experiment although the theoretical transmission was calculated to be 91%. The discrepancy was accounted by the manufacturing technology. It is apparent that such a short length collimator technology is ideally suited to the neutron source topology of the present disclosure and can be improved by one skilled in the art to achieve a commercially viable component. The collimator may also be utilized for the other embodiments disclosed herein.

A fourth aspect of the present invention is the utilization for relatively high speed and high throughput rate industrial applications. In particular the food industry with is very diverse range of products has a need for detection of foreign objects and substances that may contaminate food products. The flow rate of food product units has a wide range. Most readers will imagine the rate of production of packaged food. An embodiment which can cope with such flow rates is disclosed as a variation of the above described embodiment which are configured for scanning a stream of highly variable objects. If the objects are highly uniform, as is the case for a food production line, the detection of anomalous elemental or isotopic ratios can be recognized at a lower threshold of acquired statistical data. The effective neutron dose is correspondingly reduced. The matching of scan data with the object being scanned through the system is again achieved by a sensor data multiplexing sub-system. The embodiment is also able to deal with bulk food material such as frozen vegetables for real time detection of contaminants such as non-biological minerals, chemicals, elements and biological origin parasites such as worms. The vegetable units are already frozen by immersion in liquid nitrogen. The mass flow rate is approximately 300 kg per hour. This corresponds to a vegetable unit flow rate of 30,000 to 300,000 per hour. The size and traverse time may vary depending on the type and size range of the vegetables. If present, the contaminants or foreign bodies are distributed inside the frozen vegetable units. Detection must be fast enough to actuate a rejection mechanism for removal of the suspect vegetable unit. The high speed will require scanning and recognition of approximately 8-80 vegetable units per second! The utilization of the present invention in a linear longitudinal traverse configuration embodiment, as described above, is one option for the lower flow rate. Another embodiment described below can cope with the higher rate.

A fifth aspect of the present invention is an embodiment where objects to be scanned are passed through a cylindrical linear radially outward moving neutron field in a spiral locus. Such a traverse maximizes the specific exposure time to the neutron field while keeping the object conveyance system as mechanically simple as possible. Objects that may be interrogated can be items such as frozen or non frozen vegetables, food items in general including solid or liquid forms, small high production rate manufactured items, postal letters and bulk material, in an appropriate conveyance system. In general the row of gamma detectors and associated gamma collimation and shielding is also wrapped around the cylindrical topology to view sections of the conveyancing track. The optimal design of such a system for a particular application will have many design parameters to consider. Those that are enabled by the present disclosure are associated with the linear or planar topology of the neutron source. A point source would simply not be able to accommodate sufficient wrapped locus of conveyance means for the object to be scanned. The exposure or dose would have to be achieved through a very substantial increase on the specific neutron output of the point source. Similarly the conventional prior art utilization of a linear topology source of neutrons only teaches embodiments where the traverse locus is substantially at right angles to the linear source and not wrapped about it with a similarly wrapped array of sensors and data multiplexed connections.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE PREFERRED EMBODIMENTS

Figure 1A:
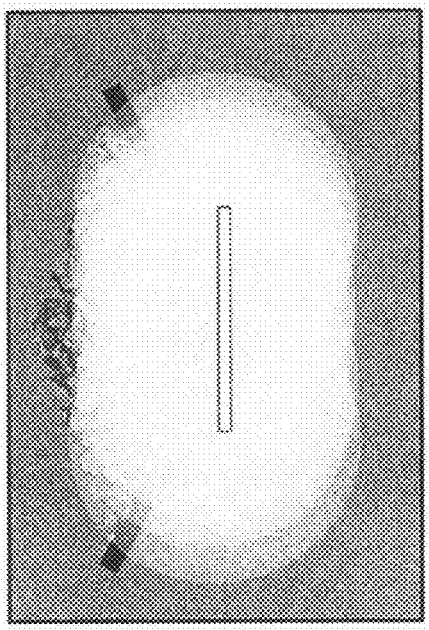
FIG. 1 shows a schematic of prior art utilization of neutrons in a typical bulk material analysis application where the material is moving through the neutron field on a conveyor belt with either point sources of radionuclide or an ideal but until recently not available line source neutron generator.
Figure 1B:
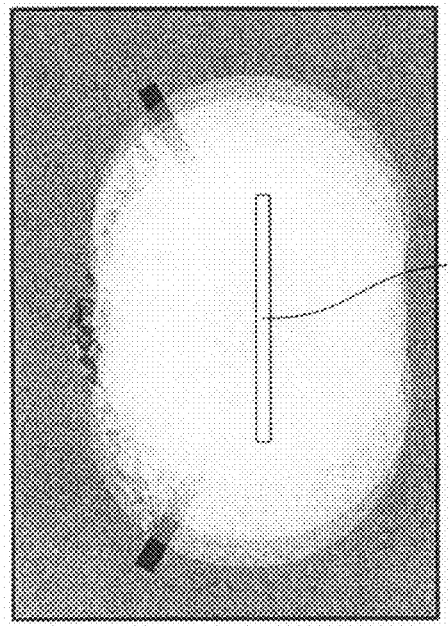
Figure 1C:
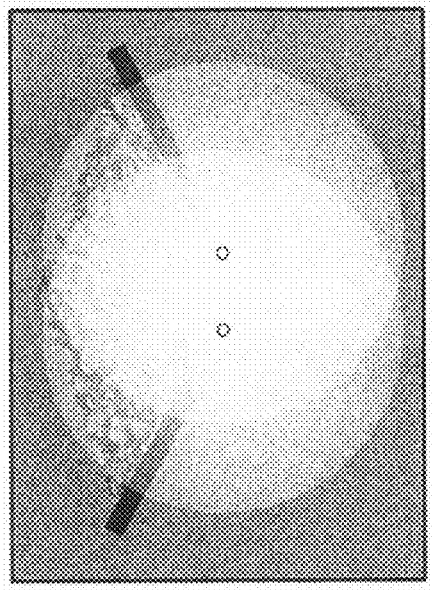
Figure 1D:
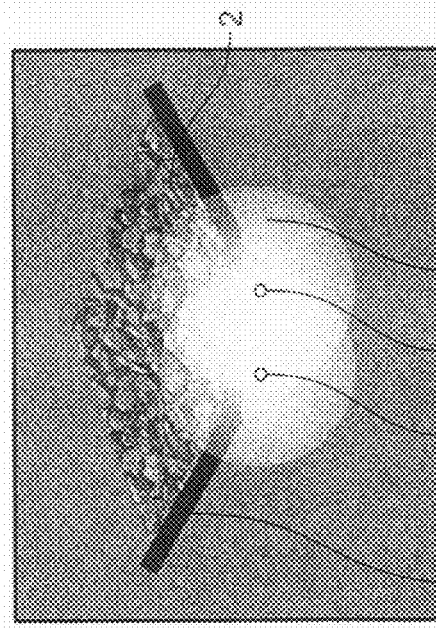

The present invention makes use of the length characteristic or more generally the three dimensional topology of neutron generators which are able to provide this feature to teach utilization in example embodiments which have not been disclosed in prior art. The applicable neutron generators have a non-point-like zone of neutron emission. With point-like neutrons sources such as radionuclides or the well known neutron generators that have been available prior to 2003 emission field characteristics similar to line sources have been achieved by the use of multiple point sources as shown in FIG. 1A where a conveyor belt 1 or similar mechanism carrying bulk material 2 is irradiated at a defined location by a flux of neutrons for an elemental analysis technique. The requirement for a line source has been implicit since the introduction by manufacturers of online mineral analysis systems with an array of point sources. The utilization of such a line source 3 is illustrated in FIG. 1B. The disadvantage of radionuclide sources 4 is illustrated in FIG. 1C where the neutron output rate of $^{252}Cf$ is halved after 2.6 years. This is illustrated by the diminished intensity 5 representation. FIG. 1D indicates the continued nominal performance of a plasma-gas target type of neutron generator as disclosed in WO03019996 and incorporated by reference herein.

FIG. 2 illustrates a conceptual tunnel screening system where objects to be interrogated by neutrons and perhaps other penetrating radiation are conveyed through the screening system continuously and without stop-start motion that has been necessary in prior art scanning systems typically reduced to practice for luggage screening. The air transport security authorities have developed performance specifications. A crucial requirement is 8 seconds per bag for the scanning and data evaluation process. All checked baggages must be subjected to level 1 and 2 screening. At present the reliability of Level 1 and 2 screening is dependant on the human operators who must recognize anomalies presented to them bag after bag after bag. Suspect objects are diverted to a so called level 3 examination where penetrating radiation interrogation systems typically utilizing X-rays are used to construct a three dimensional map in a displayable form for a human operator to interpret. The present tunnel neutron interrogation system does not have to generate images of luggage interiors for recognition of anomalies. The neutron interrogation can directly detect anomalies of element abundances which are indicators of the present of substances such as explosives. This has been described in numerous prior art and technical publications.

The present disclosure is not concerned with a particular combination of sensors and signal processing means but rather the options that can be exploited with a hitherto unavailable neutron source topology. With the length of a neutron generator of the type described by WO03019996 at least being limited only by the power supply performance required it is plausible to construct a single line source with a length of approximately 5 meter. It is also feasible to have a tunnel facility of length 10 meter with only one neutron generator reaction chamber assembly. This can be achieved by segmenting the cathode so that active segments of, for example, 0.5 meter length are separated by non active segments of electrode of 0.5 meter length. The non-active segments draw no power and hence the same power requirement for a contiguous 5 meter electrode can be associated with the afore mentioned segmented 10 meter neutron generator 11 illustrated in FIG. 2A.

Figure 2A:
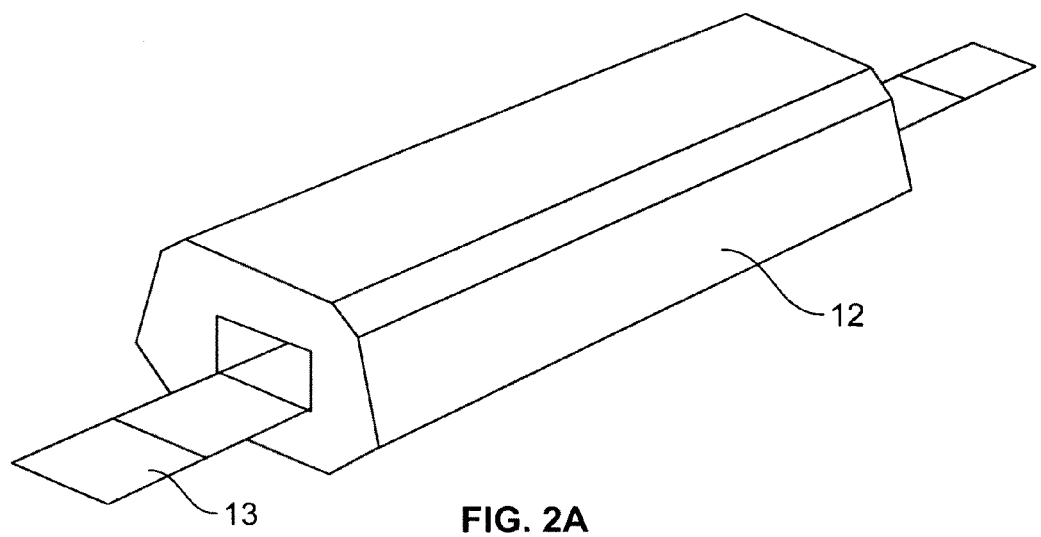
FIG. 2 shows a the utilization of one or more long line source neutron generators in a shielded tunnel configuration with high continuous throughput in a neutron interrogation system for airport level 1 or 2 security screening or a package screening system.

In FIG. 2A the external housing shape 12 is determined by the radiation shielding. The illustration neglects radiation protection at the ends of the tunnel for clarity. In a practical implementation there will be bends at each end of the tunnel in order to prevent a straight line path from any radiation source within the tunnel system to the outside.

Figure 2B:
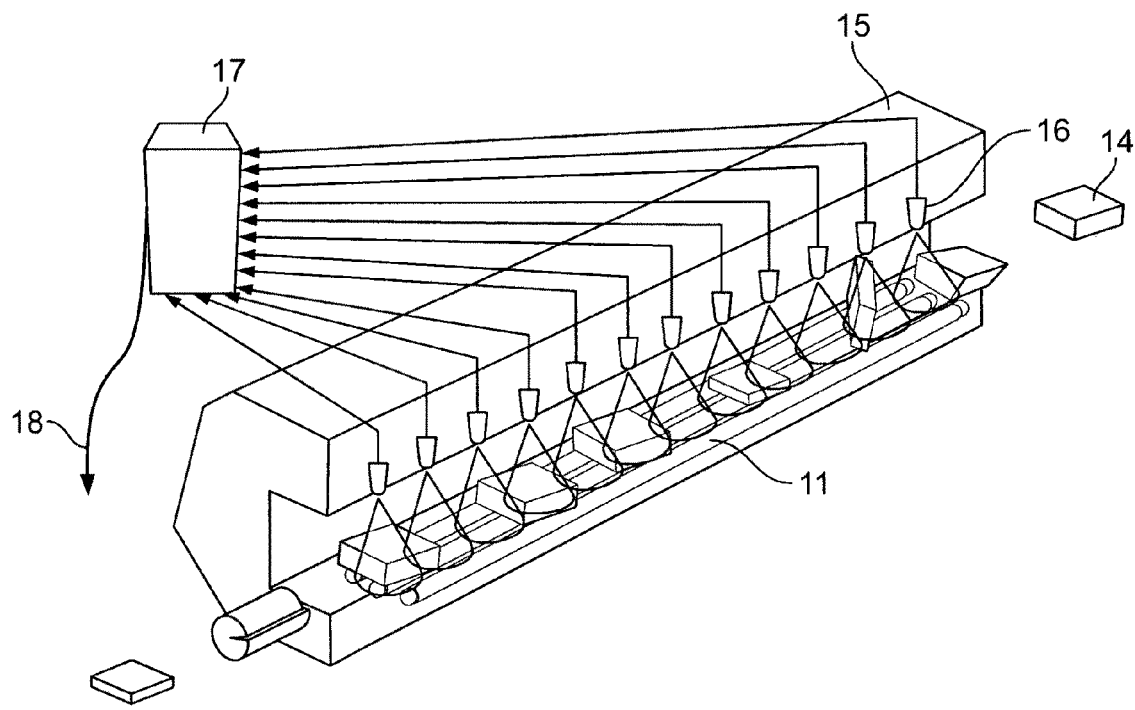

FIG. 2B shows a cutaway view of the tunnel system concept. A mechanical conveyor 13 in FIG. 2A moves the items of baggage 14 at a speed of approximately 0.5 m/s. There is a spacing of approximately 0.5 m between the items to be screened within the tunnel system. These parameters are specified by air transport security regulations. The duration of interrogation of a particular item of luggage within the example tunnel system is therefore 20 seconds. However the item never stops moving. This is very beneficial for extending the operational lifetime of the mechanical conveyor equipment. The duration of exposure to neutrons, assuming that there is a total length of neutron emission field of 5 m, will be 10 seconds. Compare this to a single neutron interrogation station where the object being scanned may only receive perhaps 6 seconds of neutron flux and gamma spectroscopic data acquisition or even less per "voxol" of scanned volume. If "voxol" scanning is performed the effective neutron exposure time may be only approximately 1 second. The time dilation effect of the long neutron source is to increase the exposure time by a factor of 5 to 10 times, depending on the assumptions made about the scanning technique or techniques that may be utilized in such a long tunnel system. Such a time dilation is a significant mitigation factor for neutron generator performance and cost.

FIG. 2B shows the cutaway of the primary radiation shielding 15 for neutrons and secondary gamma and x-ray emissions. The conveyor 13 is omitted for clarity as are many fine detail features. An array of gamma detectors plus neutron detectors and perhaps x-ray detectors is positioned to achieve an optimum view of the scanned items while mitigating the sensors' damage by the neutron flux. The sensors 16 do not have to be positioned in a line as illustrated. Also omitted for clarity are the details of neutron moderation and collimation and sensor collimation and shielding. These aspect is illustrated in subsequent figures. The sensors are available from various manufacturers who also provide comprehensive modular electronics and support equipment. It is possible for anyone skilled in the art to design a data processing architecture that will process raw sensor data into digital data packets which are sent to a centralized data processing computer 17. The multiple sensor data is multiplexed or commutated by the data processing system so that relevant data and processed statistical results are accumulated for each item moving through the tunnel. The accumulated statistics for 10 seconds of interrogation may then, or during the accumulation, be assessed automatically for anomalous patterns. In the case of an anomaly a signal 18 is sent to a diverter device which is positioned at some point near the tunnel exit and the suspect item is intercepted for level 3 inspection.

FIG. 2 illustrates a linear neutron interrogation tunnel system where the entire system is laid out in a straight line. It is also feasible to construct such a system in various folded and curved topologies that may save floor space. Vertical directions of transit where the conveyor has bucket or tray holders for the item to be scanned can be envisaged. One or more line or plane source or curvilinear topology neutron sources can be utilized.

Figure 3A:
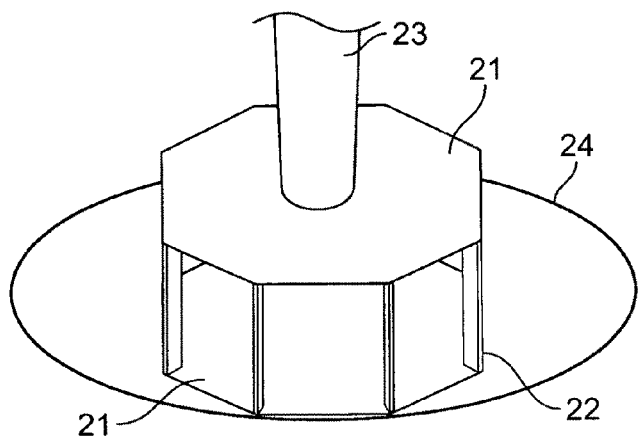
FIG. 3 shows cathode grid cell of WO03019996 in two forms which in normal operation with the anode can maintain a planar zone of neutron emission.

FIG. 3 illustrates plasma-gas target source topologies which are derived from WO03019996. A short cathode as shown in FIG. 3A is based on a the polygonal topology and in this example has four pairs of diametrically opposed holes defined by the end disks 21 and the longitudinal vanes 22. The cell structure is mounted on a stem 23 which is attached to a high voltage feed through as described in WO03019996. The extent of the neutron emission zone is determined be the inner wall anode structure. In FIG. 3A the anode wall is represented by the ring 24. Therefore the neutron emitting zone can be briefly described as a central disk with a diameter somewhat greater than the mean diameter of the cathode cage with the thickness of said cage and a superimposed disk with an outside diameter matching the anode inner wall diameter. The larger diameter disk will have a neutron intensity distribution that is somewhat gaussian plus regions of greater intensity corresponding the radial star beams through each grid hole pair. This aggregated zone of neutron emission can be described as planar when viewed along the axis of the support spindle.

Figure 3B:
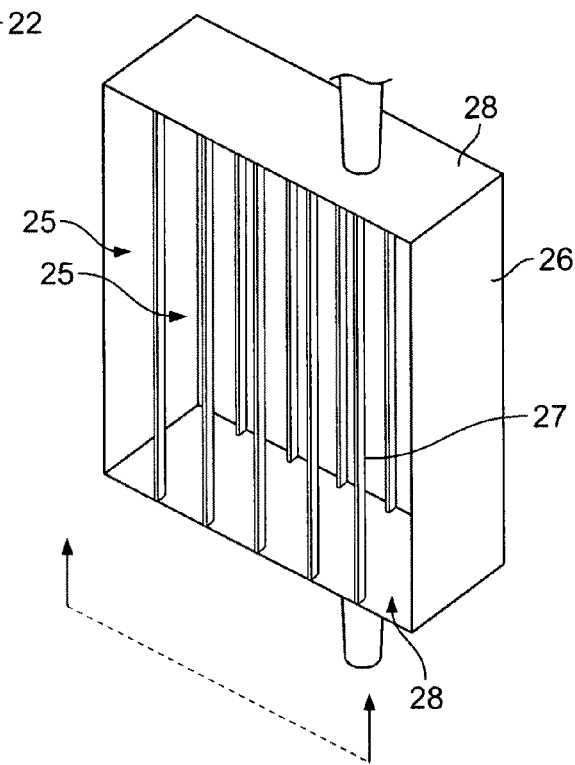

FIG. 3B shows an improvement which also delivers a planar field of neutron emission when viewed from a specific axis. In this case the typical long cathode grid cage electrode topology of WO03019996 is distorted to achieve the cage structure shown. Again there are opposing hole pairs 25. The end disks of FIG. 3A are extended to form a rectangular frame 26 with the vanes 27 suspended between the end disks 28 which are now end plates to which the supporting spindles are attached.

Figure 3C:
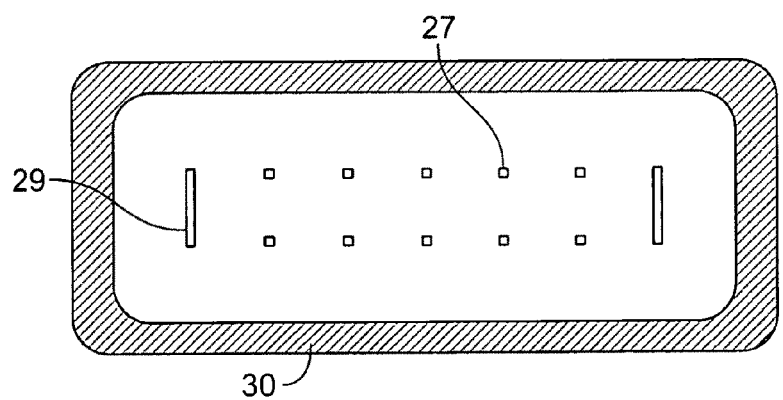

FIG. 3C shows the cross-section of the rectangular electrode 29 including the anode wall of the vacuum vessel 30. It is apparent that the cathode and anode topology is still similar to that disclosed in WO03019996 so that the operation of a steady glow discharge plasma-gas target is still feasible under similar conditions. The planar neutron emission zone has its central plane coincident with the long axis in FIG. 3C. It is apparent that shapes other than rectangular can be formed and the vanes mounted so as to define the hole pairs. If a circular planar neutron source is required the frame can be made circular.

Figure 4A:
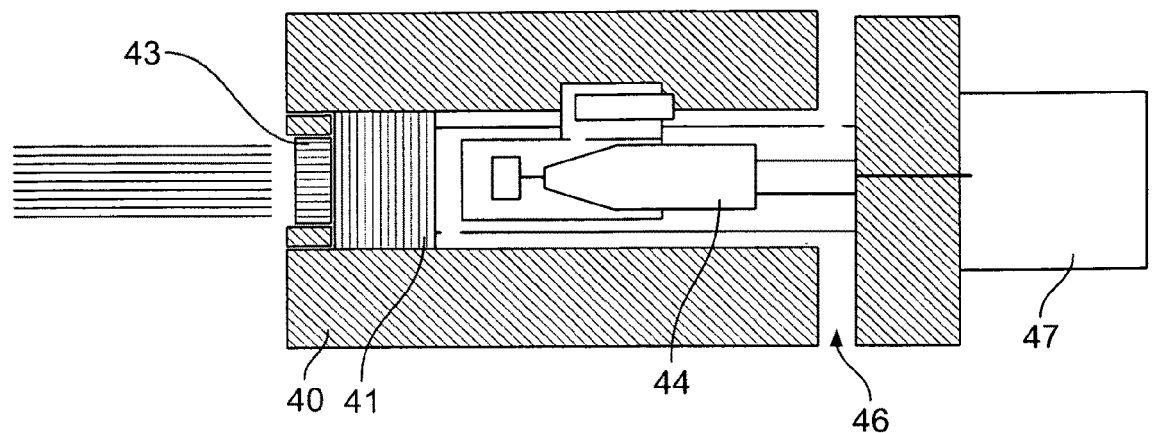
FIG. 4 shows a short and a longer cathode embodiment neutron generator with examples of neutron shielding, moderation and collimation.
Figure 4B:
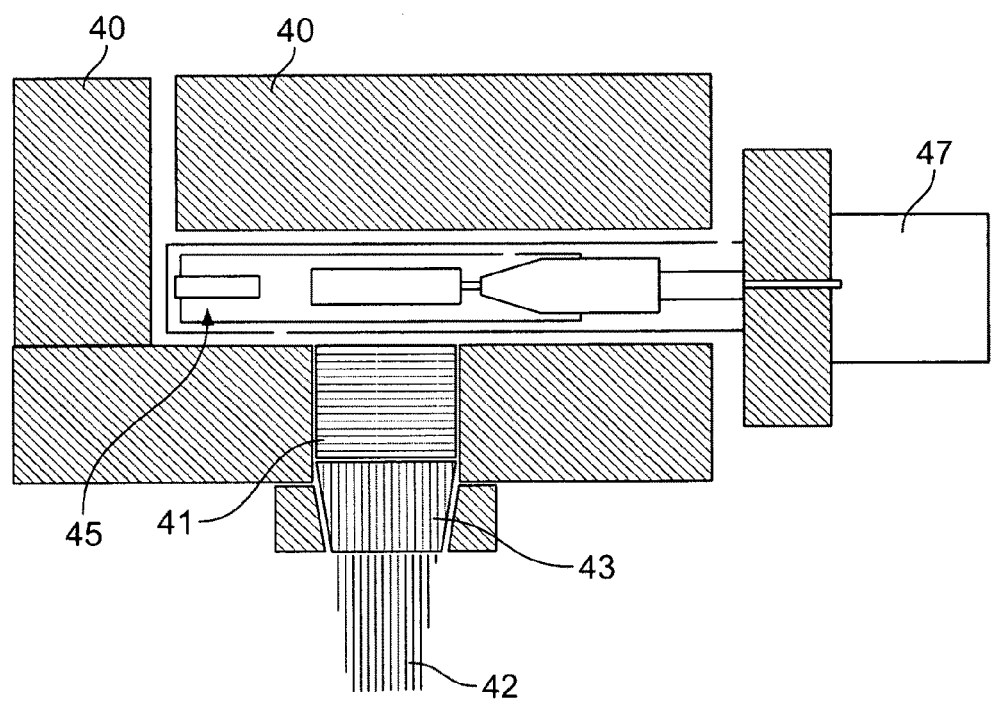

FIG. 4 shows two variations of a embodiment of the planar or linear neutron source based on WO03019996. FIG. 4A illustrates a source topology which may be approximately circular and planar as viewed along the axis of motion of the collimated neutrons. The electrode will be generally of the form shown in FIG. 3A. FIG. 4B also illustrates a source topology which may be approximately circular or rectangular and planar as viewed along the axis of motion of the collimated neutrons. The electrode will be either a long version of the form generally shown in FIG. 3A or a variant of the form shown in FIG. 3B and FIG. 3C.

Although a cursory glance at FIG. 4 may give the impression that this is the same as many collimated neutron sources, the unique features are associated with the feasibility of utilizing the length and planar topology of the neutron emission fields from a compact sealed tube neutron generator rather than a fission reactor or a scanning accelerated particle beam on target device. The illustrated systems deliver a collimated beam of thermal or slow neutrons which may be used for certain types of radiography or medical therapy such as Boron Neutron Capture Therapy or neutron activation tomography.

FIGS. 4A and 4B common features are neutron shielding 40 and neutron moderator 41. A beam of thermal neutrons 42 is formed by a collimator 43 of the Soller type or as disclosed by Franks GB 1047596 which teaches a Soller type collimator for point sources or preferably the rolled bimetallic micro-Soller type as disclosed by B. E. Allman, A. Cimmino and A. G. Klein & W. A. Hamilton, Proc. SPIE 3449,175 (1998) (see website http://scatterbrain.ssd.ornl.gov/NSatHFIR/RecentResearch/WAH/MicroSol/MicroSol.HTML). The micro-Soller collimator is essentially composed of a bimetallic or bi-layer or multilayer composite foil where one metal such as Aluminum has negligible absorption and scattering for thermal neutrons and the other such as Gadolinium is highly absorbing of the neutrons. The transmission foil may be ten of microns thick while the absorbing layer is as thin as practicable to minimize cross-sectional blockage. The composite foil is ductile and rolled to either a circular form or an elongated form. If the layers are tapered the rolled foil will assume a conical topology with the effect of focusing the emerging thermal neutrons. The foil may also be cut and layered. It is feasible to optimize the tapper, as well as the entry and exit faces to optimize the collimator for the complex linear or planar neutron emission fields and moderator material in order to produce a thermal neutron beam of either near parallel moving thermal neutrons or converging thermal neutrons. The transmission loss of such a device has been reported to be approximately 50% in a proof-in-principle experiment although the theoretical transmission was calculated to be 91%. The discrepancy was accounted by the manufacturing technology. It is apparent that such a short length collimator technology is ideally suited to the neutron source topology of the present disclosure and can be improved by one skilled in the art to achieve a commercially viable component.

FIG. 4A and FIG. 4B further show the hermetically sealed reaction chamber neutron generator of WO03019996 in a short electrode configuration where there is a cantilever support from the high voltage feed through assembly 44. A second high voltage stand-off assembly may be employed if the mass of the electrode assembly is deemed excessive. The reactant gas is stored and released to maintain the necessary pressure by a getter pump 45. A labyrinth structure 46 accommodates coolant input and outlet as well as cables. The high voltage power supply 47 may be attached close to the reactor chamber to provide a compact neutron beam emission unit as may be utilized for medical and some industrial applications where movement while actually operating may be a characteristic.

Figure 5A:
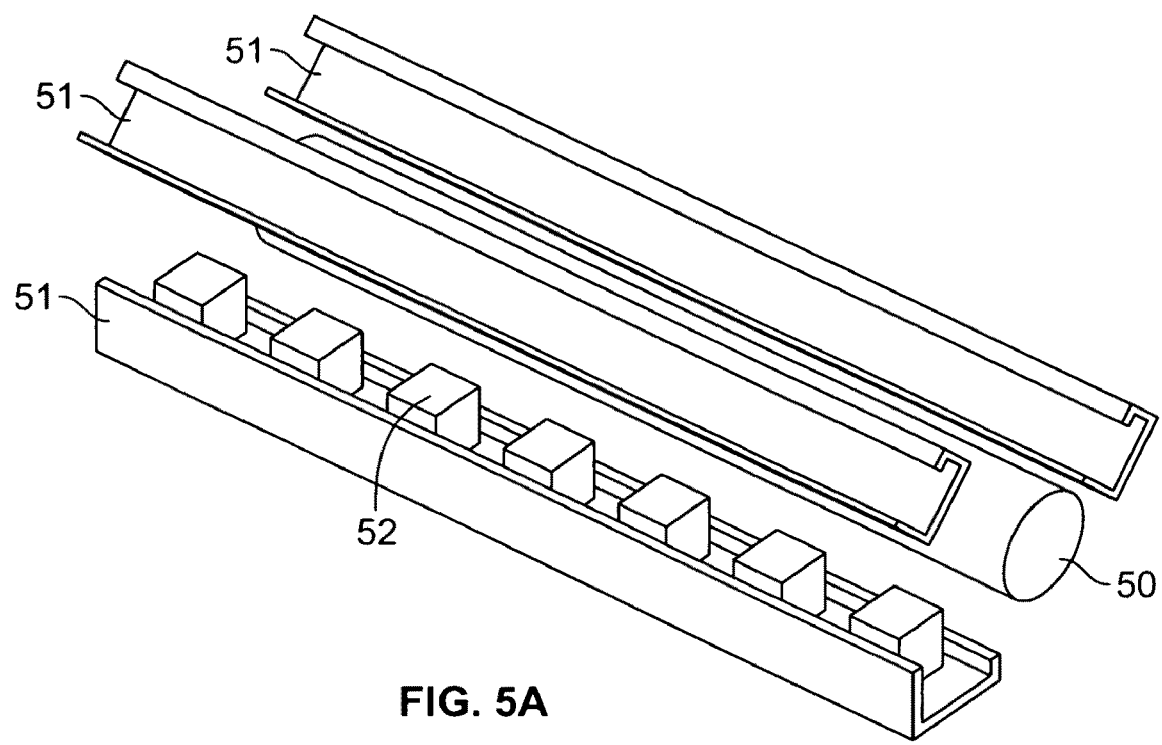
FIG. 5 shows an embodiment of a generalized industrial application of a long line source neutron generator utilized for the screening of a standard product on a production line such as found in the food industry.

FIG. 5 shows an embodiment for high throughput scanning of products on a production line. The products are typically food products. The objective is to use neutron interrogation techniques to identify anomalies from the normal elemental abundance ratio of the food product. An anomaly is likely to indicate the presence of a contaminating substance or object or a plurality thereof within the food product unit. The level of sensitivity needed to be achieved is much less than the parts per billion ($10^{-9}$) level that may be achieved in a laboratory. One specification is the permissible level of contaminant which may be parts per million ($10^{-6}$) or greater. The level of sensitivity and reliability of the statistical data will depend in part on the accumulated neutron dose and gamma measurement time. The great the number of neutron hits, so the amount of gamma quanta that may be captured by the sensor array. It is therefore apparent that a scanning system will have to combine neutron source specific intensity (per unit length) with overall effective length and transit time of the object being interrogated along the length of the neutron emission field. The linear topology reduces the neutron intensity requirement to a level that is practically achievable and less demanding of the radiation shielding. A higher specific neutron intensity in the same configuration will increase the elemental ratio sensitivity. An embodiment of this teaching is illustrated by a liner source 50 in FIG. 5A of the type of WO03019996 where the effective length of the cathode grid and neutron emission zone is approximately 3 m.

FIG. 5A shows a scanning system comprised of three conveyor channels or tracks or guides 51 that move standard food product units 52 through the neutron field. The number of such conveyor units may be selected with consideration of the size of the food product units and sub-system equipment accommodation. The neutron moderation, detectors and other features are omitted in order to show how the objects to be interrogated are guided through the neutron field surrounding the linear topology neutron source in order to increase the time and accumulated neutron radiation dose while avoiding a constriction of the flow of food product on the production line. The utilization of more than one conveyor effectively lengthens the available transit time by slowing the transit speed while simultaneously maintained the total throughput rate. Materials handling and conveyor system mechanical design skills are available to one skilled in the art for the implementation of a divider and recombination function at the front and back end of the neutron interrogator system. A suspect package or food unit diversion mechanism may also be similarly implemented.

Figure 5B:
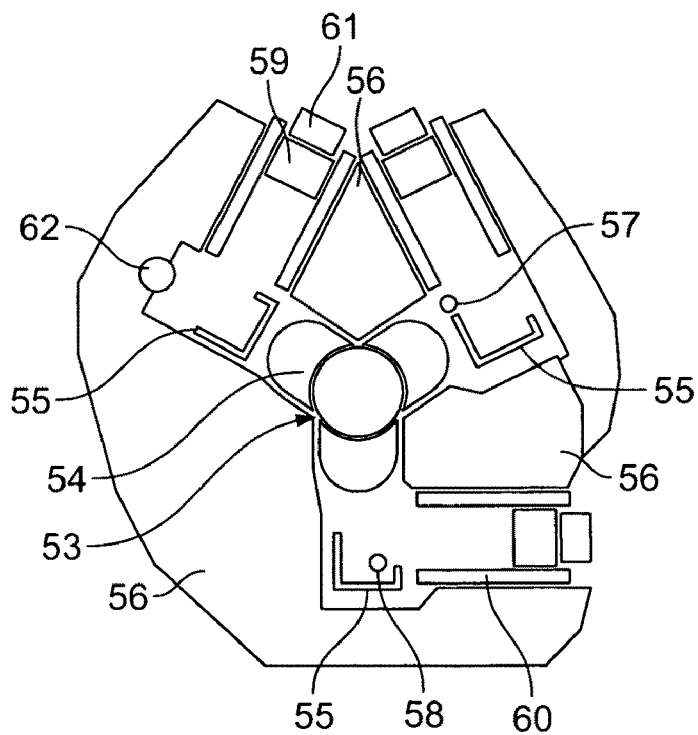

FIG. 5B illustrated a generalized cross-section where the neutron generator of type WO03019996 produces a neutron emission zone along the axis which is perpendicular to the page. The neutron generator vessel and heat exchanger structure 53 is mounted with a neutron moderator structure 54 which will typically slow 14 MeV or 2.5 MeV neutrons to thermal energies determined to be appropriate for the specified interrogation task and neutron thermalization characteristics of intervening conveyor equipment components 55 and the interrogation subject. Collimation of the neutrons will be implemented by means of the shielding materials 56 where apertures 57 will be provided to collimate the emitted neutrons into a beam passing through the transit track 58 of the objects being scanned. The neutron beams may be conical or fan-like so as to optimize the collection of gamma quanta from the target scanning zone while avoiding stray gamma quanta from adjacent scanning zones.

FIG. 5B also shows the position of gamma sensors 59, gamma shielding and collimation 60 and the associated electronics 61 to prepare standard gamma quanta energy pulse information. The gamma sensors may be implemented with NaI or with HpGe technology or any other deemed appropriate. A typical installation will avoid a direct impingement of neutrons on the detector. Therefore the detector will be positioned to view the object to be scanned but offset from the bean beam as shown in this example. The longitudinal positioning of scanning zones and sensors will be determined by equipment accommodation considerations and the characteristics of the achievable gamma and neutron collimation features. Spacing of the scanning zones along a given conveyor guide or track may be influenced by isolation of one scanning zone from another to avoid gamma quanta reaching the adjacent scanning zone detector and thus causing false information. Similar considerations of interference and accommodation may also determine the relative spacing of scanning zones on adjacent conveyor tracks. Co-planar or staggered arrangements may be implemented.

There will be a data processing architecture utilizing equipment that is readily available from some commercial nuclear instrument manufacturers that will enable one skilled in the art to implement a sensor data multiplexing system that will accumulate the data flowing from the appropriate sensor as each product unit passes through the respective scanning zone. Even before all scanning zone data have been received for a particular product unit, running pattern recognition software will have had sufficient time to determine if the elemental and isotopic abundance ratios are normal or anomalous.

It is also feasible to incorporate sensors other than gamma quanta energy sensors. In particular neutron sensors 62 will be utilized to measure the neutron flux attenuation that would be caused by contaminants such as plastic micro particles or larger plastic objects. The high hydrogen content of plastics will scatter neutrons and thus reduce the measured neutron flux at a neutron detector located in the neutron beam where the object to be scanned passes between the neutron source and the neutron flux detector. Such a detector would only need to be installed at one position on each conveyor track. Neutron detectors may be of the Helium 3 type or any other gas or solid state type that may be assessed as appropriate for the application.

FIG. 6 shows some possible configurations of the neutron generator cathode grid of WO03019996. It is also feasible and more costly to reduce to practice the more complex electrode structures of U.S. Pat. No. 6,922,455 and US 2002131543 to achieve a similar neutron emission source topology which is collimated as shown.

Figure 6A:
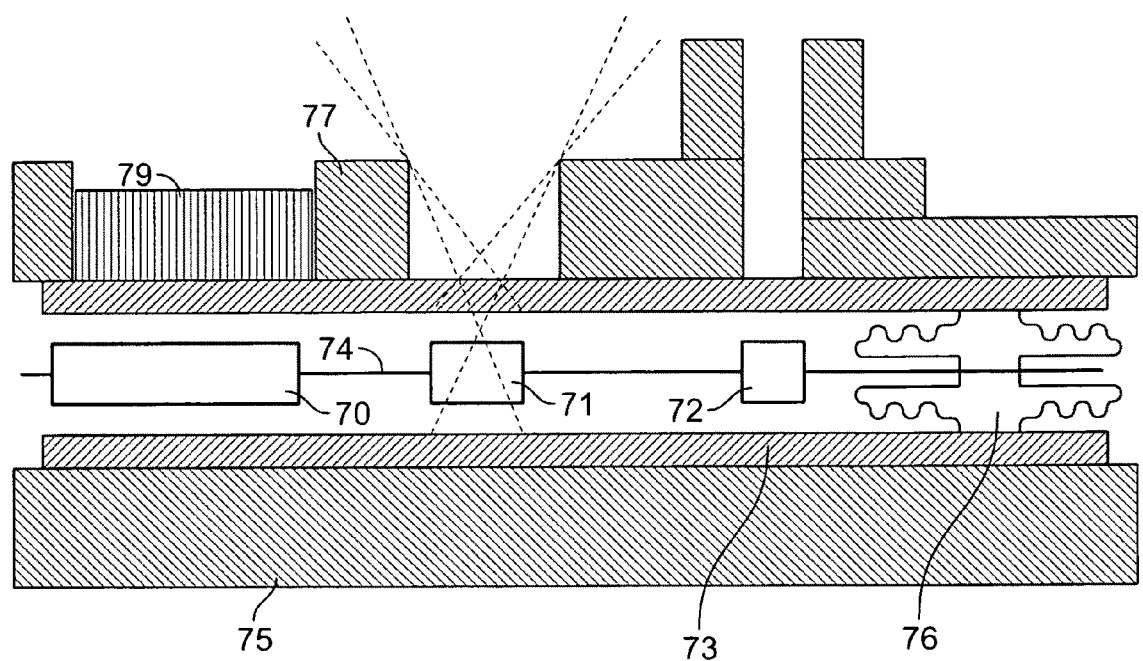
FIG. 6 shows examples of segmented cathode and associated shielding and collimation to achieve generation and escape of neutrons at specific locations along a long line or planar source.

FIG. 6A provides a side view of a segmented line or plane source where the neutron emission zone is determined by the length of the cathode cage structure segment 70, 71, 72 and the inner wall of the vacuum vessel 73. Neutrons are emitted isotropically. There is an increased intensity from the central core defined by the cathode cage structure. Unwanted neutrons are mitigated by making sections of the cathode grid not a grid structure but simply a cylindrical rod 74 which is firmly welded to the cage structures. This also provides benefit by reducing the electrical high voltage power consumption. On long segmented cathode assemblies high voltage stand-off components 76 made of $Al_2O_4$ ceramic may be used. Such stand-offs will have holes or cut-outs near the periphery to allow the passage of the reactant gas.

Figure 6B:
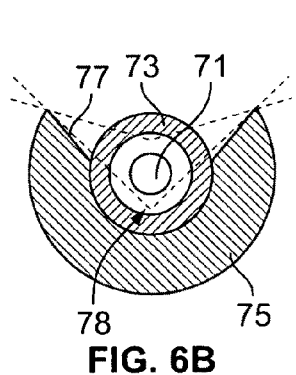
Figure 6C:
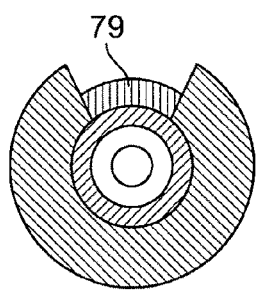

In sections or segments where neutron emission is required, there is usually a requirement to shield or block neutrons emitted in directions where they are not required so as to decrease the radiation hazard and interference. Such shielding 75 may surround most of the neutron generator chamber. An aperture or hole 77 in such shielding will be a simple collimator to permit neutrons to emerge with minimal scattering energy loss. FIG. 6B shows a cross-section view of the simple aperture collimator. Note that the angles of the sides of the hole and the topology of the hole can be varied to suit the application and desired cone or fan angles. The non point or 2D line topology of the neutron emission can be considered in the design of the aperture. FIG. 6B shows a general aperture that would yield a very wide angle neutron beam of approximately 135 degrees in the plane of the drawing. The higher flux part of this beam would be with a cone angle of approximately 90 degrees with the apex 78 set back on the edge of the zone of greatest neutron emission FIG. 6C shows a narrower cone angle collimator which has a neutron moderator 79 which may be composed of pure polyethylene, for example. The thickness of the moderator in the radial direction will be determined by the inelastic scattering required to reduce the neutron energy.

Figure 6D:
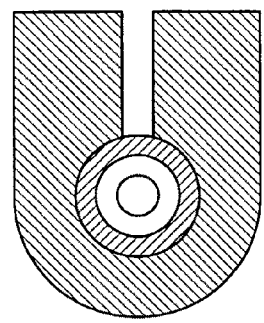

FIG. 6D shows a very narrow collimator as defined by the length versus diameter ratio. Such high aspect ratio collimation will be governed by the size of neutron emission zone. Baffling of the neutron emission zone will reduce the apparent source intensity.

FIG. 7 shows an embodiment that can screen postal letters at a high throughput rate which may be expected within a postal sorting center. The system again relies on a sensor data multiplexing architecture to accumulate the brief data set per letter transit at each sensor location so as to acquire statistically significant data of the measured elemental abundance ratios for each letter. Anomalous letters would be diverted for additional inspection by slower x-ray or chemical analysis techniques.

Figure 7A:
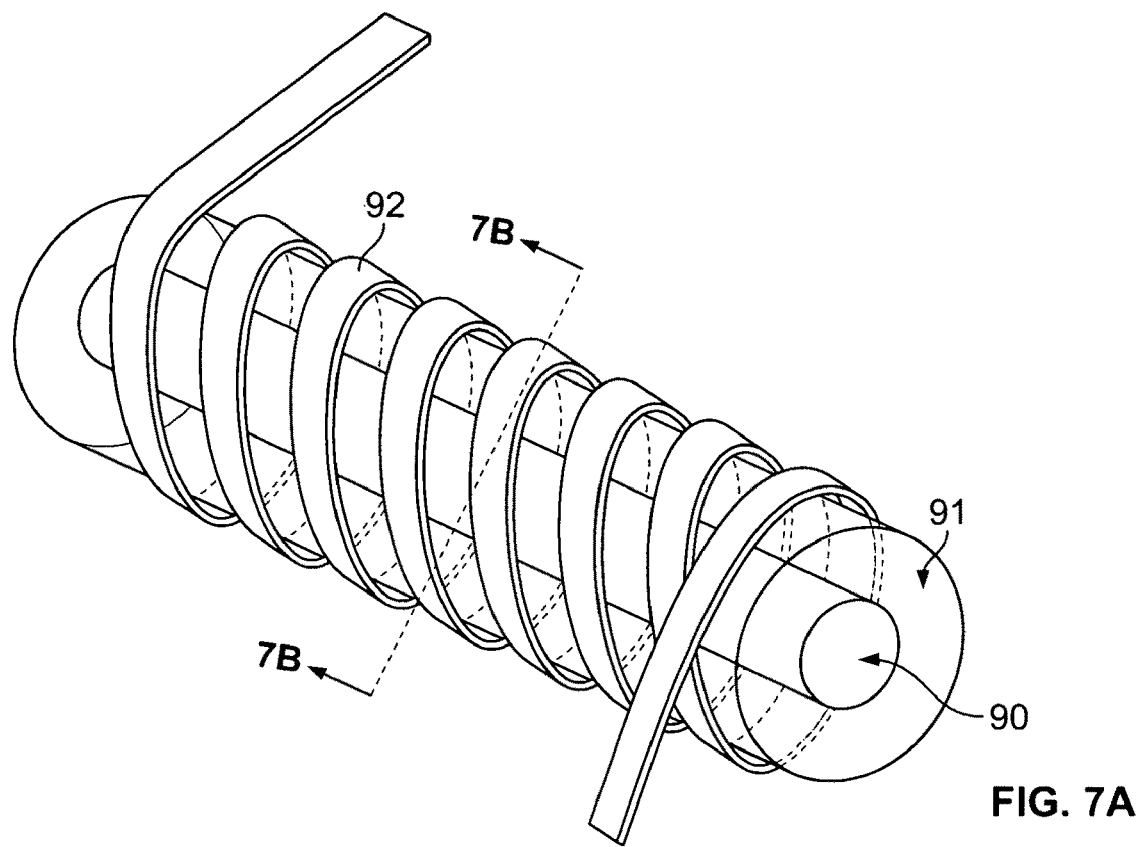
FIG. 7 shows a schematic of a linear geometry neutron source utilized to screen a high throughput rate of postal letters whereby the letters are conveyed through the neutron field for a maximum amount of time in order to accumulate an elemental abundance signature for each letter by multiplexing of the many gamma sensor data streams in synchronization with the transit of each letter.

FIG. 7A shows the topology of the neutron interrogation system for postal letters where the primary objective would be the detection of explosives. Such letter bombs would have to potential of causing serious damage to hands and face as well as increasing terror. The system is comprised of a linear neutron source 90 preferably of the type disclosed in WO03019996 with a length of 1 to 5 meters is surrounded be neutron moderator 91 material such as pure polyethylene so as to achieve a flux of thermal neutrons of an average energy deemed suitable for neutron interrogation. The neutron moderator 91 may be constructed so that the average thermal neutron energy emitted at various positions along its length changes for the objective of optimizing the sensitivity of efficacy of the neutron interrogation techniques. A postal letter conveyancing mechanism 92 is wrapped around the neutron moderator 91 so as to form a spiral which maximizes the transit time of each letter through the neutron field. The postal letter conveyancing mechanism means will be familiar to one skilled in the art. It will include means to regulate the speed and synchronize the transit of a letter past each sensor position. The entire assembly may be mounted vertically or horizontally.

Figure 7B:
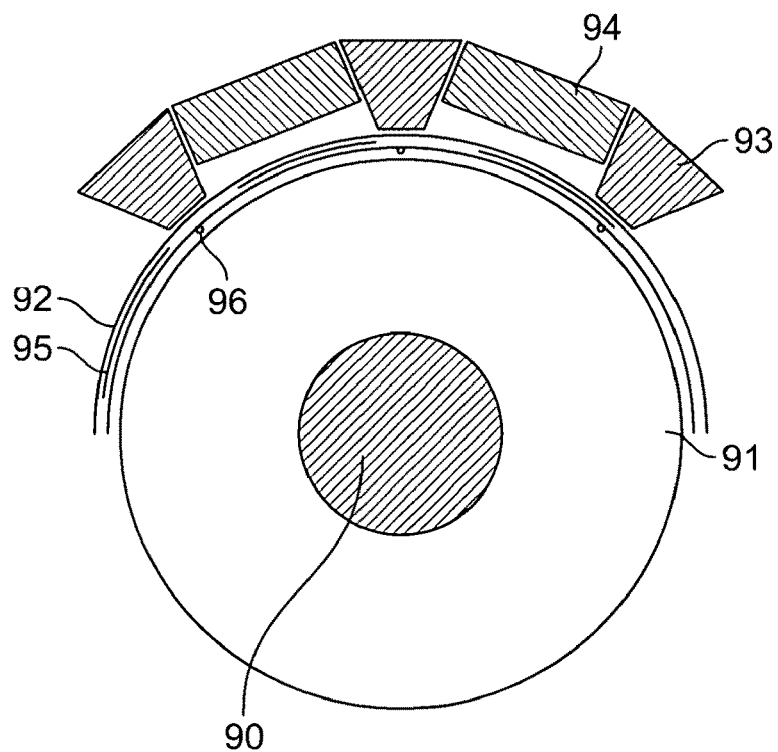

FIG. 7B show a view of section AA in FIG. 7A where the general position of gamma shielding 93 and gamma sensors 94 are indicated. The sectional view is set at an angle so that the cylindrical neutron generator 90 and moderator 91 appear elongated. A segment of the letter 95 conveyancing mechanism 92 is shown with representations of the locations of support structures for, rollers and similar devices 96. An overall neutron and gamma shield plus housing in not shown.

Other embodiments of the linear geometry may be envisaged in order to suit specific applications. It will be apparent that the broad teachings of the present invention can be profitably applied to specific embodiments and applications far beyond what is set forth above for the purposes of illustration. While the invention has been shown and described with reference to certain embodiments thereof, it will be understood by those skilled in the art that various changes in form and detail may be made therein without departing from the scope of the invention as defined by the appended claims.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

Figure 8:
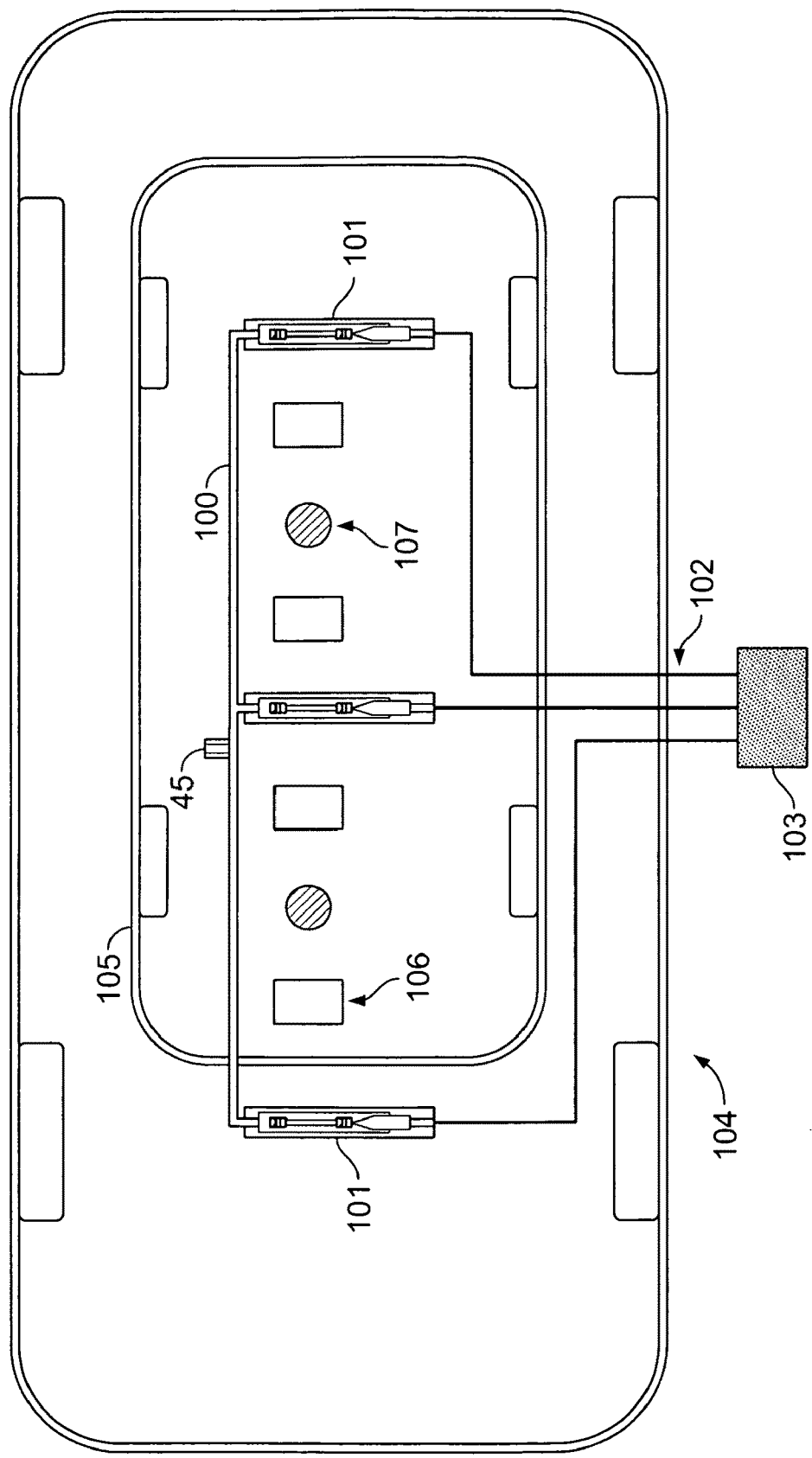
FIG. 8 shows the topology of the neutron generator configured for interrogation of vehicles where the primary objective would be the detection of explosives. Several linear neutron source units which may have continuous or segmented electrode neutron emission zones are connected together by a vacuum manifold which allows the free movement of the reactant gas.

FIG. 8 shows the topology of the neutron generator configured for interrogation of vehicles where the primary objective would be the detection of explosives. The system is comprised of several linear neutron source units 101 which may have continuous or segmented electrode neutron emission zones. The multiple reaction chambers are connected together by a vacuum manifold 100 which allows the free movement of the reactant gas. The reaction chambers may have any relative orientation and may be aligned in non-linear arrangements such as for a curved baggage conveyor belt. The gas storage and pressure regulation device 45 is also hermetically attached to the combined vacuum chamber manifold at any convenient location. The positions of the neutron emission units 101 and the gamma detectors 107 plus neutron shielding 106 is determined by a detailed optimization analysis. The high voltage cables 102 are connected to a high voltage power supply and distribution switch unit 103 which can be utilized to operate each neutron emission unit separately or in tandem. Economic benefit is achieved by the reduction of power supply and supporting control electronics to one set. In particular there is a minimization of the inventory of reactant gas, which may be subject to radioactive material regulations, within the system because only one common getter pump unit 45 is necessary. One common control unit automation computer can manage the entire system. It is obvious that there is a wide range of permutations of such a system configuration.

Figure 9:
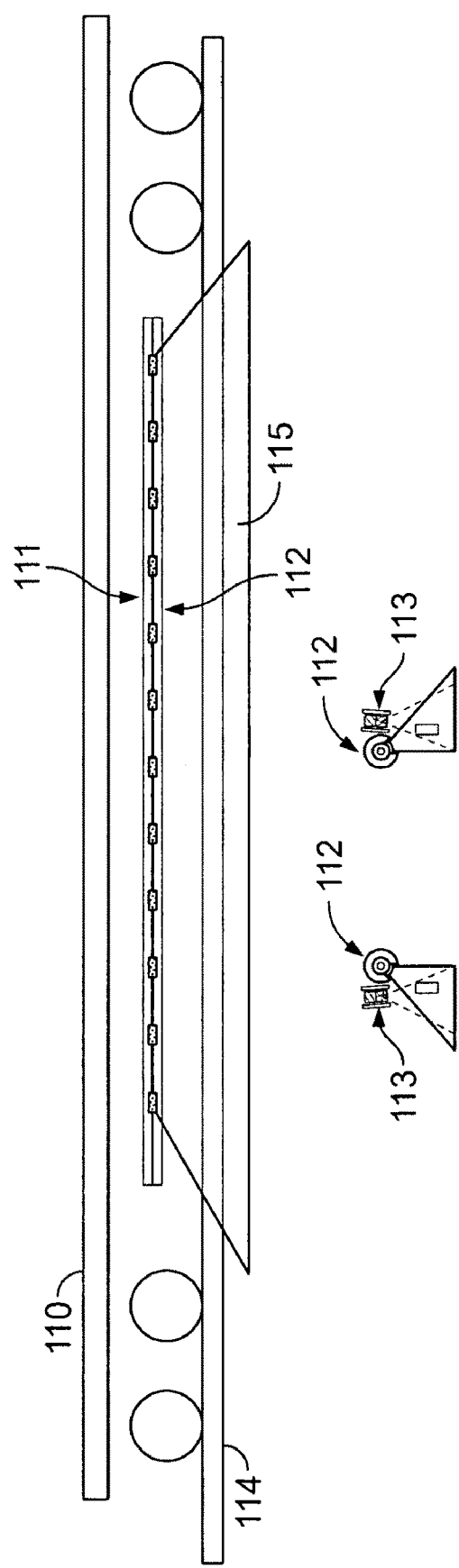
FIG. 9 shows the utilization of the linear neutron generator in a mobile application on a railway carriage. The objective is to detect hidden explosives that are planted under the rail tracks and concealed by the stones. The maximum speed of the track may be approximately 100 kilometer per hour.

FIG. 9 shows the utilization of the linear neutron generator in a mobile application on a railway carriage 110. The objective is to detect hidden explosives that are planted under the rail tracks 114 and concealed by the stones. Calculations indicate that a level of neutron emission that is consistent with the achievable specific performance of linear neutron generator 110 is sufficient to enable a total exposure of neutrons on a small segment of track 115 where a bomb may be hidden to enable a statistically significant indication of a gamma spectral anomaly caused by the explosive. The maximum speed of the track may be approximately 100 kilometer per hour (approximately 27.8 meter per second). Clearly this is a function of many parameters which include the specific neutron output, the neutron flux at or just under the rails, the effective length of the neutron source 112, detector 113 efficiency and other factors which will effect the neutron delivery to the region under the rails.

Figure 10:
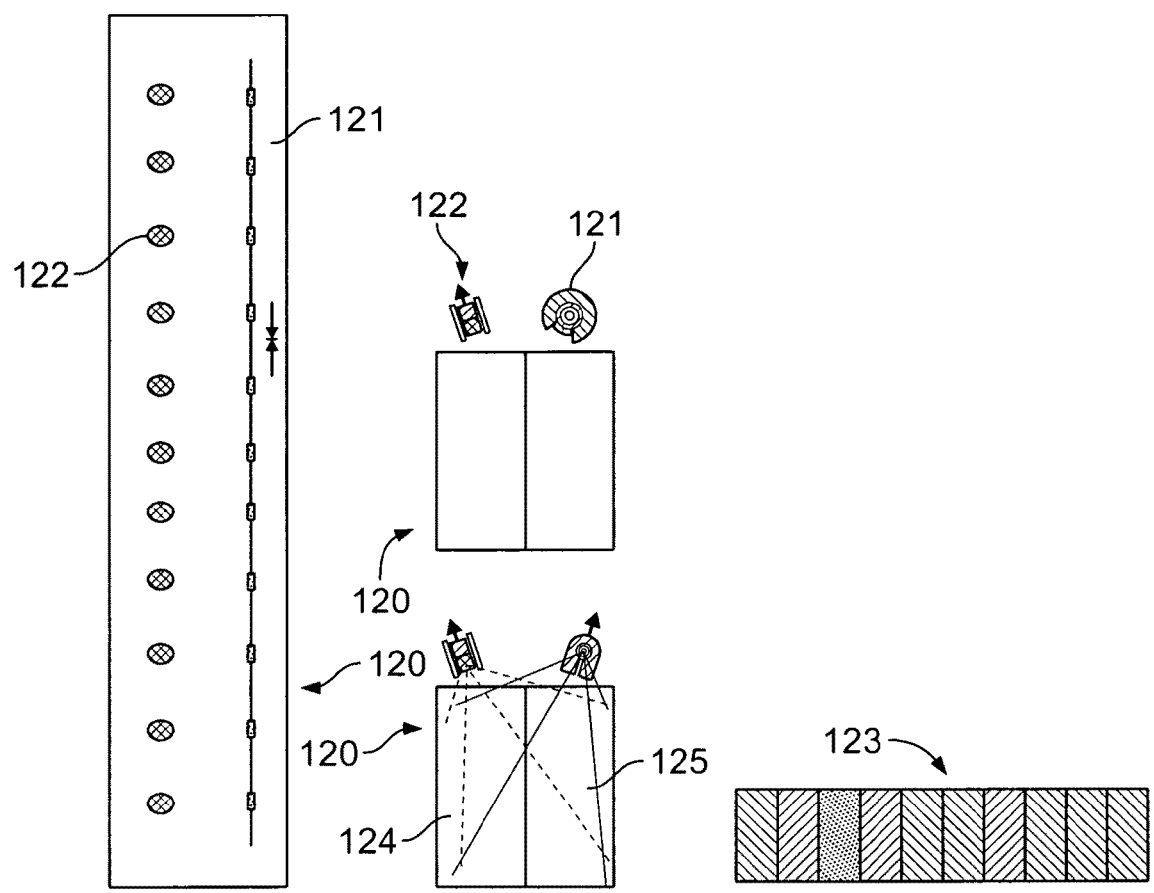
FIG. 10 shows the utilization of the linear neutron generator in a relatively static situation. However the combined shipping container plus neutron source and gamma detector array may be in motion on a vehicle such as a crane spreader or a container moving "straddler" vehicle.

FIG. 10 shows the utilization of the linear neutron generator in a relatively static situation. However the combined shipping container 120 plus neutron source 121 and gamma detector array 122 may be in motion on a vehicle such as a crane spreader or a container moving "straddler" vehicle. In such a case the long neutron source brings economic benefit though its lower total cost compared to many separate neutron sources. Comparison of results achievable with typical neutron fluxes and neutron generator output levels indicates that approximately 30 seconds of neutron exposure would be necessary to obtain a statistically significant indication of the presence of fissile material or shielding material. The array of detectors may be organized to provide crude resolution of the location of a suspicious object within the container as illustrated in the conceptual display 123 where color coding would indicate the position within the container to focus further non-invasive scanning techniques. Design analysis will determine the optimal neutron source characteristics for penetration 125 and interaction with the interior contents in order to yield as many gamma photons 124 to be detected by the array. Various schemes such as oscillation of the field of view of detectors or the direction of the neutron slit beam may be envisaged to enhance the production of useful interrogation information.

What is being claimed is:

1. A process for exposure and measurement of neutron induced effects on objects to be examined comprising the steps of:
   (a) providing an exposure and measurement apparatus comprising a neutron interrogation system with an elongated neutron source selected from the group consisting of radionuclides and an electrically powered nuclear reaction confining device with steady or pulsed output;
   (b) operating the exposure and measurement apparatus to examine a plurality of objects selected from the group consisting of objects in relative motion with respect to the exposure and measurement apparatus and objects of large size with respect to the exposure and measurement apparatus by using the neutron interrogation system to provide a neutron emission having substantially linear topology and an initially uniform flux along a longitudinal axis of the source for neutron interrogation of the objects to be interrogated, the neutron emission being conveyed at a rate compatible with specifications selected from the group consisting of industrial production line specifications and security checking system performance specifications;
   wherein the objects to be scanned are arranged to move along a locus or parallel set of loci that either is parallel to the longitudinal axis of the source or traces a spiral about the longitudinal axis of the source while progressing from a first end of the neutron interrogation system to a second end of the neutron interrogation system to thereby extend or dilate the duration of immersion in and exposure to a field of neutrons generated by the source so as to effectively accumulate dose and corresponding neutron interactions for measurement by an array of nuclear physics scanning station sensors and data processing instrumentation;
   wherein the nuclear physics sensors and data processing instrumentation multiplex individual sensor data to provide refined results and accumulate the refined results so as to associate a statistical measurement result with a single object or zone that travels through the neutron interrogation system in order to identify any object or zone that has an anomalous signature of measured parameters; and
   wherein the plurality of objects are contained within a large object having a size and mass great to make expedient moving the exposure and measurement apparatus concurrently with the large object so as to mitigate stop-start movements of the container relative to the operating neutron interrogation system.

2. The process as claimed in claim 1, wherein the plurality of objects pass through or pass by the neutron interrogation system without being stopped for exposure and data collection.

3. The process as claimed in claim 1, wherein the neutron source comprises a plurality of points of origin of neutrons which occupy a neutron emission volume of three dimensional space so that the extent of the neutron source is not a unitary or near unitary point source of approximately 10 mm mean diameter or less.

4. The process as claimed in claim 3, wherein the neutron emission volume is elongated so as to be planar or linear, where planar means that first and second dimensions in first and second orthogonal axes respectively are approximately equal while a third dimension in a third orthogonal axis is relatively short, and where linear conversely means first and second relatively short orthogonal axes and a third relatively long orthogonal axis.

5. The process as claimed in claim 1, wherein a plurality of elongated neutron sources are used in combination, the neutron sources being segmented so that neutrons are emitted only from active segments rather than along an entire length of the neutron sources, the active segments corresponding with the scanning station sensors within the neutron interrogation system.

6. The process as claimed in claim 1, wherein the objects to be interrogated in defined industrial production or recycling applications are essentially identical and are passed individually in series through the neutron interrogation system and wherein there is a predefined standard acceptance pattern of characteristic interrogation data for an automated anomaly recognition system implemented by so called pattern recognition algorithms for real-time comparison and detection of anomalies caused by contaminant material and foreign objects.

7. The process as claimed in claim 1, wherein, the objects to be interrogated are all diverse where non standard characteristics are measured in order to enhance an automated anomaly recognition system implemented by so called pattern recognition algorithms for real-time comparison and detection of anomalies caused by presence of fissile material, explosives or contraband materials within an object.

8. A process for exposure and measurement of neutron induced effects on objects to be examined comprising the steps of:
   (a) providing an exposure and measurement apparatus comprising a neutron interrogation system with an elongated neutron source selected from the group consisting of radionuclides and an electrically powered nuclear reaction confining device with steady or pulsed output;

(b) operating the exposure and measurement apparatus to examine a plurality of objects selected from the group consisting of objects in relative motion with respect to the exposure and measurement apparatus and objects of large size with respect to the exposure and measurement apparatus by using the neutron interrogation system to provide a neutron emission having substantially linear topology and an initially uniform flux along a longitudinal axis of the source for neutron interrogation of the objects to be interrogated, the neutron emission being conveyed at a rate compatible with specifications selected from the group consisting of industrial production line specifications and security checking system performance specifications;

wherein the objects to be scanned are arranged to move along a locus or parallel set of loci that either is parallel to the longitudinal axis of the source or traces a spiral about the longitudinal axis of the source while progressing from a first end of the neutron interrogation system to a second end of the neutron interrogation system to thereby extend or dilate the duration of immersion in and exposure to a field of neutrons generated by the source so as to effectively accumulate dose and corresponding neutron interactions for measurement by an array of nuclear physics scanning station sensors and data processing instrumentation;

wherein the nuclear physics sensors and data processing instrumentation multiplex individual sensor data to provide refined results and accumulate the refined results so as to associate a statistical measurement result with a single object or zone that travels through the neutron interrogation system in order to identify any object or zone that has an anomalous signature of measured parameters; and wherein a relationship between a flux level of neutrons passing through an object being interrogated and duration of transit through a flux field is set with respect to available neutron intensity or strength of the neutron source so that a specific neutron emission rate per unit of length in a transit direction or measurement zone is integrated or summed to be equivalent or greater than a dose accumulated from a collimated beam from a single point source of much greater intensity.

* * * * *